Jan. 11, 1955  A. H. HEINRICH  2,699,366
BEARING SEAL
Filed Oct. 9, 1953
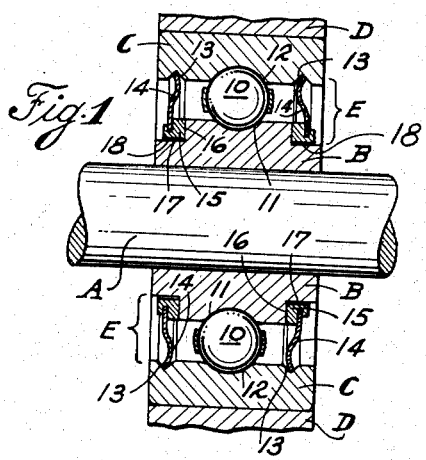
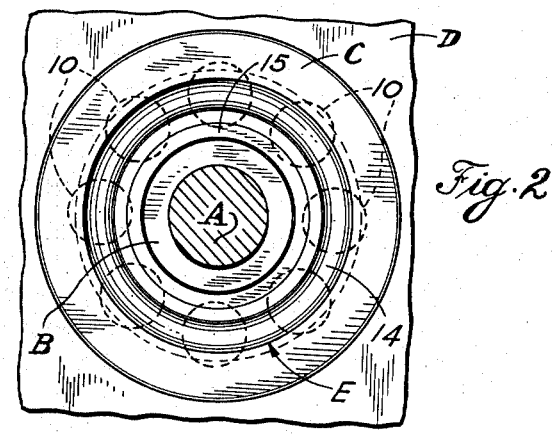
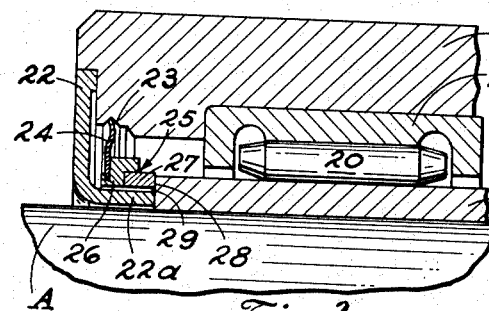
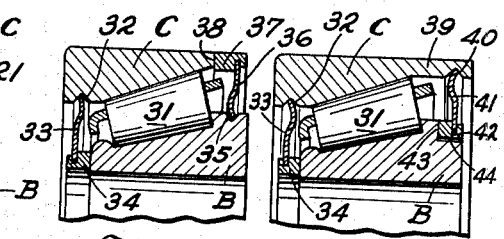
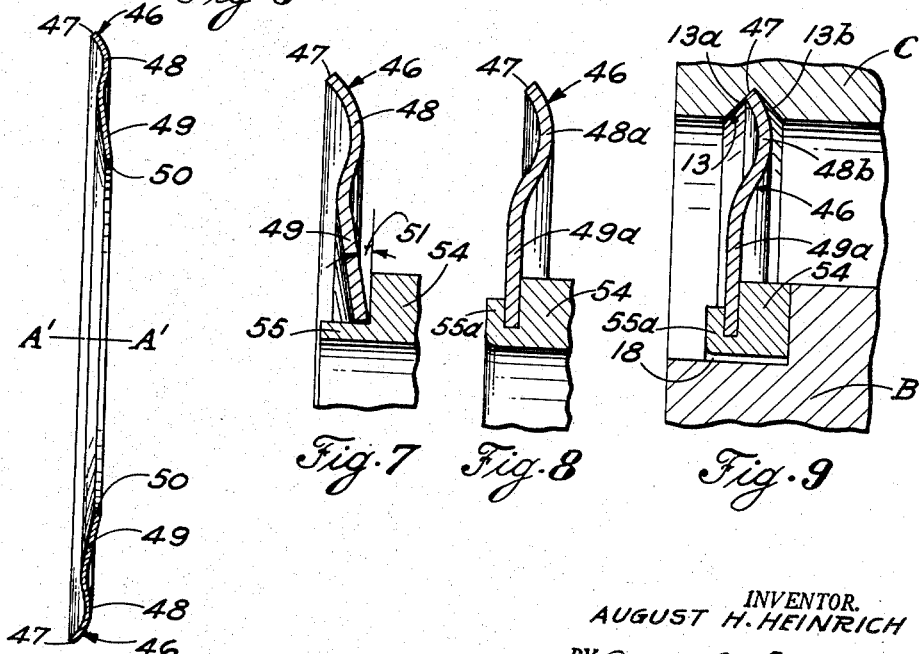
INVENTOR.
AUGUST H. HEINRICH
BY Bosworth, Sessions,
Herrström & Williams
ATTORNEYS

United States Patent Office 2,699,366
Patented Jan. 11, 1955

2,699,366

BEARING SEAL

August H. Heinrich, Euclid, Ohio

Application October 9, 1953, Serial No. 385,117

10 Claims. (Cl. 308—187.2)

This application, which is a continuation-in-part of prior application Serial No. 358,745, filed June 1, 1953, for "Sealing Systems," is directed to sealing systems for bearing assemblies such as ball bearings, needle bearings, tapered roller bearings, etc.

In the past, numerous attempts have been made to provide such bearing assemblies with built-in sealing systems for excluding contaminants and preventing the escape of the lubricants that conventionally are introduced into many such assemblies at the factory. These built-in sealing systems have not, however, been particularly successful, due in part to the fact that in actual use the bearing assemblies are subject to endwise thrusts giving rise to axial movements of kinds producing misalignment of inner and outer races. In some cases, if misalignment amounts to more than about .001 inch, the sealing system will fail to function properly and can even become disengaged from the bearing assembly in which it is incorporated. Replacement or repair at frequent intervals is therefore necessary, which is something that is difficult at best in view of the manner in which bearing assemblies are installed in industrial equipment.

It is an object of the present invention to provide a bearing assembly provided with a sealing system in which the permissible movement between inner and outer races may be very much greater than in the bearing assemblies of the prior art without producing leakage, permitting entry of contaminants, or bringing about separation of the sealing system from the bearing assembly. To this end, the invention provides a bearing assembly and sealing system therefor in which an annular metal spring is so engaged within a triangular groove in the inner or outer race of the bearing assembly that there is extensive surface contact between the transversely extending edge of the spring and one of the two walls of the groove. As will appear, this carries with it a number of unique advantages one of which is the fact that relative movement between inner and outer races may exceed 0.050 inch without producing any malfunction of the sealing system.

Other objects and advantages of the invention will be apparent from the description which follows and from the accompanying drawings, in which:

Figure 1 is a central section with parts in elevation through a ball bearing assembly incorporating a sealing system of the kind to which the invention relates.

Figure 2 is a side elevation of the ball bearing assembly of Figure 1.

Figure 3 is a central section with parts in elevation through a portion of a needle bearing assembly incorporating the features of the invention.

Figures 4 and 5 are central sections with parts in elevation through portions of two tapered roller bearing assemblies incorporating the invention in different ways.

Figure 6 is a central section through an annular spring of the kind used in the invention, the spring being shown on a scale approximately twice that of Figures 1 to 5.

Figures 7, 8 and 9 illustrate in fragmentary fashion the manner in which the spring is mounted in the bearing assembly, the scale being approximately four times that of Figures 1 to 5.

Figure 1 shows a ball bearing assembly incorporating the principal features of the invention. The shaft is designated A. The inner annular member, designated B, is the inner race; the outer annular member, designated C, is the outer race. The bracket, frame, or other structural element in which the ball bearing assembly is mounted is designated D. There are two sealing units, one on each side of the ball bearing assembly, each of which is designated E. Outer race C is rigidly affixed to element D. Inner race B, which is pressed to or shrunk on shaft A, is rotatable with the shaft. Inner race B and outer race C are positioned one within the other in the usual way and are spaced from each other by a series of bearing balls 10. The oppositely facing portions of inner race B and outer race C are provided with smoothly contoured channels 11 and 12, respectively, which are so designed as to conform to bearing balls 10.

From Figure 1 it will be apparent that the inner face of outer race C is provided near the end portions thereof with two triangular grooves 13 which flare or open out as they approach inner race B. These grooves, shown in exaggerated fashion in Figure 1, are only a few thousandths of an inch deep, having in a typical case an altitude of the order of .005 to .010 inch, measured from the smooth inner face of outer race C. The included angle, defined by the two diverging side walls 13a and 13b (Figure 9), is a right angle, although in a given case it may be more or less than 90 degrees, as may be desired. Grooves 13 are accurately formed by a machining operation capable of imparting a smooth finish to side walls 13a and 13b. They are preferably located as close to the end faces of outer race C as may be practicable.

As will be explained at greater length hereinafter, an annular metal spring 14, constituting part of sealing unit E, seats along its outer edge in groove 13, there being two such springs, one for each groove, in the ball bearing assembly of Figure 1. The portion of inner race B confronting groove 13 is provided in each case with a shoulder accommodating an accurately finished sealing ring 15. The latter, formed as hereinafter described, serves to anchor spring 14 in position. It makes contact with a transversely extending surface 16 on inner race B which surface is perpendicular to the longitudinal axis of shaft A. The two contacting surfaces, one stationary and the other rotatable, are so accurately finished that as a practical matter there is no possibility of leakage between them. The degree of accuracy of the finish is preferably within two light bands. Sealing ring 15 rides on a cylindrically formed surface 17, which, together with sealing surface 16, forms the previously mentioned shoulder. There is between them a clearance 18 of the order of a few thousandths of an inch, in a typical case .005 inch. Clearance 18 is shown in exaggerated fashion in Figure 1.

The manner in which these several parts co-act will be explained in conjunction with the detailed description of Figures 6 to 9; in the meanwhile, it may be noted that analogous use may be made of such sealing units in a needle bearing assembly of the kind illustrated in Figure 3. In the latter, shaft A mounts an inner annular member B (commonly referred to as the quill) which is located within an outer annular member C corresponding to the outer race C in the ball bearing assembly of Figure 1. Needle bearings 20, which make contact in the usual way with quill B, are held in place by cage 21. The outer end of the needle bearing assembly is closed by an end cover 22 provided with an inwardly turned portion 22a, there being one such end cover at each end of the bearing assembly. The parts so far mentioned are largely conventional in their construction and manner of operation.

Formed in the inner face of outer annular member C not far from end cover 22 is a triangular groove 23 similar to groove 13 of Figures 1 and 9. In engagement therewith is an annular metal spring 24. The latter is anchored along its inner peripheral edge to a sealing ring 25 which is made up of two parts: namely, a metal mounting ring 26 and a bearing ring 27, which may be of metal or non-metal. The two parts are held rigidly to each other by brazing or in any other suitable fashion. The inner face of bearing ring 27 is in sealing contact with the end face 28 on quill B, the two surfaces being so accurately finished that there can be no escape of lubricant between them. On the other hand, the fit between the inwardly turned portion 22a of end cover 22 and the adjoining face of sealing ring 25 may be a running fit with a clearance 29 of several thousandths of an inch. No unusually high degree of accuracy is required of the machining operations by which these surfaces are finished.

In Figure 4, a tapered roller bearing assembly is shown. The latter makes use of two inner and outer races, B and C, having between them a series of tapered bearing elements 31, one of which appears in elevation. Toward one end thereof, the bearing assembly is provided with a triangular groove 32 in outer race C, an annular metal spring 33, and a sealing ring 34, the latter being in tight sealing engagement with the exposed end face of inner race B. At the opposite end thereof, the bearing assembly is provided with a triangular groove 35 in inner race B, an annular metal spring 36, and a sealing ring 37, the latter making tight sealing engagement with the proximate end face of outer race C. In each of the two sealing units, the contacting surfaces between the sealing ring and the end face of the race against which it abuts are machined to a very high degree of accuracy, usually within two light bands, this so as to preclude the escape of lubricant between them.

Figure 5 illustrates a somewhat similar bearing assembly in which, however, outer race C has thereon an extension 39. In extension 39 is formed a triangular groove 40 for receiving the outer edge of an annular metal spring 41 which is anchored along its inner edge in a sealing ring 42. As indicated in Figure 5, sealing ring 42 is located in a shoulder on inner race B. It makes sealing engagement with the surface 43 thereof. The latter and the proximate face of sealing ring 42 are so accurately machined that lubricant cannot escape between them.

It will be noted that in each of the several embodiments of the invention illustrated in Figures 1, 3, 4 and 5 the outer race is characterized by a triangular groove near one or both ends thereof, that an annular metal spring seats in said triangular groove, that the spring is anchored at its inner edge in a sealing ring, and that the sealing ring is in sealing engagement with a surface on the inner race extending transversely to the axis of the shaft; i. e., parallel to the central plane of the bearing assembly. In each case the sealing surfaces; i. e., the abutting surfaces of the sealing ring and the inner race, are finished to a very high degree of accuracy, usually to a degree of smoothness within two light bands. If, as in Figures 1 and 3, the sealing ring rides on a cylindrical surface, there may be any suitable clearance between them as, for example, a clearance of the order of .005 inch. It will be observed from Figure 4 that these relationships need not be followed slavishly, but, as therein shown, that the arrangement of parts may in some circumstances be reversed so that the groove is in the inner race and the bearing ring makes contact with the outer race.

Whatever the relationship between the sealing ring and the inner and outer races, the spring itself preferably takes the form shown on an enlarged scale in Figure 6. Although annular in shape, spring 46 is not flat in the sense of being perpendicular to axis A'—A' but so formed that the transverse outer edge 47 thereof makes an acute angle to axis A'—A', preferably an angle of 45 degrees. This angularity is introduced into the spring at the same time as the bowed portion 48 of short radius of curvature, approximately ⅛", which immediately adjoins transverse outer edge 47. As appears from Figure 7, there is no flat area between them; there is, however, a shallow frusto-conical portion 49 on the opposite side of bowed portion 48, such frusto-conical portion extending to the transverse inner edge 50 of spring 46. Ordinarily, in a spring of the kind being described, the radial length of bowed portion 48, measured from transverse outer edge 47 to the point where the bowed portion 48 is faired into frusto-conical portion 49, is roughly equal to the radial length of frusto-conical portion 49.

As further indicated in Figure 7, frusto-conical portion 49 makes an angle of about 80 degrees to axis A'—A'; in other words, angle 51 is about 10 degrees. It may, however, be more or less, depending on the diameter of the bearing assembly, which is 3 inches in the case of the bearing assembly illustrated in Figure 1. In the case of a bearing assembly 5½ inches in diameter, it can be about 15 degrees; in the case of a bearing assembly 50 inches in diameter, as much as 30 degrees. In cases wherein the diameter of the bearing assembly is less than that of the 3-inch bearing assembly illustrated in Figure 1, the angle may be 9 degrees, 8 degrees, 7 degrees or even less. There is, therefore, a very considerable range over which angle 51 may be varied.

As further indicated in Figures 7 and 8, the inner edge portion of spring 46 may be anchored in the sealing ring substantially as in prior application Serial No. 358,745.

The precise manner of mounting the inner edge portion of spring 46 in the sealing ring may be varied widely, but in a typical case sealing ring 54 will be formed with a projecting end flange 55 which can be turned over, as at 55a, by a process of spinning, crimping, rolling or the like to clamp the inner edge portion of spring 46 in place between the body of sealing ring 54 and turned-over portion 55a. One effect of turning over end flange 55 in this manner is to eliminate angle 51, as shown by Figure 8. Another effect of so anchoring the spring is to shorten the already short radius of curvature characterizing bowed portion 48, as a result of which the latter takes on the appearance indicated at 48a in Figure 8. Still another effect is to partially preload the spring in the zone wherein it is anchored to the sealing ring, thereby developing the advantages explained at length in said prior application.

At this stage, the spring has enhanced stiffness as a result of the preloading just mentioned. It is not lifeless, as is the stock from which it is formed or even the spring itself when first stamped out of the stock. The preloading is of the order of 3 to 5 lbs., although it may be more or less, depending in part on the thickness of the stock and in part on the magnitude of the angle 51 which is eliminated in anchoring the spring in place in the sealing ring. Together, the spring and sealing ring constitute a sub-assembly which need not be introduced immediately into a bearing assembly but which may be stored, if desired, particularly if protected against damage to the surface of the sealing ring which is to engage the inner or outer race of the bearing assembly.

The sub-assembly so made up is brought when needed into juxtaposition to a suitably formed end surface on the inner or outer race of a bearing assembly with the sealing ring taking approximately the position which it is expected to assume in actual use. Then, by pressure of the fingers or force applied by a suitable tool, the outer edge portion of spring 46 is snapped into the triangular groove already described. By so doing, one arrives at the arrangement of parts shown in Figure 9, which illustrates what happens where a spring formed as above described is snapped into place in the 90 degree groove 13 of outer race C of the ball bearing assembly of Figure 1.

It will be observed from Figure 9 that the transverse outer edge of spring 46; i. e., edge 47, makes surface contact with wall 13a of groove 13 but does not make extensive contact with opposite wall 13b. This area contact between edge 47 and wall 13a is not a matter of chance but results from the fact that the acute angle assumed by edge 47, described above in conjunction with the introduction into spring 46 of bowed portion 48 (now further bowed as at 48b), conforms to the angularity of side wall 13a of groove 13. Without such matching of these surfaces, the contact would not be area contact but line contact or something approximating line contact. Area contact is desirable for the reason that it holds the outer peripheral edge portion of spring 46 more securely in place and, in practically all cases, prevents spring 46 from rotating about axis A'—A' (Figure 6). There is, therefore, little or no relative movement as between spring 46 and outer race C.

In the several embodiments of the invention illustrated in Figures 1 to 9, inclusive, the included angle in the triangular groove 13, 23, 32, etc. is a right angle, although it is self-evident that it need not measure exactly 90 degrees and may be more or less in consequence of the fact that one wall thereof need not make contact with the peripheral outer edge portion of the spring. In the preferred embodiments of the invention, the spring has an overall diameter approximately 0.001 inch larger than the maximum diameter of the groove in the race in which its transverse outer edge is positioned. In other words, measuring the diameter of the groove from the apex of the groove on one side of the bearing assembly to the apex of the groove on the diametrically opposite side, the diameter should be somewhat less, perhaps .001 inch, than the overall diameter of the sub-assembly consisting of the spring and sealing ring. Obviously, the actual difference in the two diameters may in practice be somewhat less than the preferred difference of .001 inch.

Not only can the stiffness of the spring when mounted in the bearing ring be varied in the ways previously suggested, as by varying the thickness of the stock, modifying angle 51 (Figure 7), or changing the angularity of the transverse outer edge 47, but variation in the altitude of the triangular groove into which the spring is snapped will tend to vary the stiffness of the spring.

For example, the altitude of groove 13 may be deliberately varied over a considerable range to increase or decrease the developed pressure. Thus, using a spring having a diameter of 2.315 inches, pressure of 3 lbs. will be developed in stock .005 inch thick if the altitude of groove 13 is such that the diameter of the groove from apex to apex is 2.314 inches. On the other hand a pressure of 5 lbs. will be developed if the altitude of groove 13 is changed to an extent such that the overall diameter of the groove from apex to apex is 2.313 inches. In either case, the diameter of the inner face of the race in which groove 13 is formed may measure about 2.300 inches, so that in the one case the altitude of groove 13 will be .007 inch and in the other case .0065 inches. In such case, the minimum diameter of the sealing ring will normally be 1.300 inches and the minimum diameter of the inner race may be of the order of 1.181 inches.

It has been suggested that the thickness of the stock may in a typical case be .005 inch. It is not necessary, however, that the spring be made of stock of this gauge, for the thickness may vary between about .001 and .010 inch, the latter being the thickness assumed in making up the accompanying drawings. The heavier thicknesses will of course give the greater pressures and the lighter stocks will give lower pressures when urged endwise against the resistance of the sealing unit as a whole. The stock of which the spring is formed may be any suitable spring material including spring brass, spring steel, stainless steel, nickel-chromium alloys, etc.

As in prior application Serial No. 358,745, the sealing ring may be made of graphite bronze or similar bearing material containing a carbonaceous inclusion or, if desired, of sintered metal formed by powder metallurgy techniques into a hard ring; e. g., "Oilite" may be used for the purpose. Where the sealing ring consists of a mounting ring and a bearing ring, the former may be of any suitable metal; the latter, of graphite bronze, sintered metal or carbon, pressed or otherwise worked to arrive at a suitable shape and thickness. In some instances, particularly where sintered metal sealing rings are employed, the portion thereof which is to be turned over into contact with the spring may be pre-treated as by peening, as described in the prior application.

In the circumstances in which a bearing is provided as illustrated with a triangular groove in one race, a sealing ring in or on the other, and an intervening spring of the kind described, considerable axial or lengthwise movement between the inner and outer races is permissible. In prior constructions, it has frequently been necessary to hold the permissible movement down to extremely low levels, as, for example, .001 inch; however, with the sealing unit of the present invention, the relative movement axially of the bearing assembly between the inner and outer races can exceed .050 inch and may be as great as .060 inch without interfering with the effective operation of the sealing unit. Notwithstanding relative movements of such magnitude, the sealing unit functions effectively to retain any lubricant which is introduced into the bearing assembly when made up or, where necessary, to exclude contaminants. Thus the sealing units and bearing assemblies of the present invention have important practical advantages in that they can operate under adverse conditions without separating from each other.

It is intended that the patent shall cover, by summarization in appended claims, all features of patentable novelty residing in the invention.

I claim:

1. A bearing comprising two generally annular members, one within the other; bearing elements intervening between oppositely facing portions of the two annular members; means forming a continuous groove of triangular cross-section in the outer of the two opposing portions; a sealing ring in contact with the annular member in which is formed the other of the two opposing portions; and, anchored at its inner periphery to the sealing ring, a thin annular metal spring the transverse outer edge of which makes surface contact with one of the two side walls of said triangular groove.

2. A ball bearing characterized by the groove, sealing ring and spring of claim 1, the bearing elements taking the form of balls.

3. A needle bearing characterized by the groove, sealing ring and spring of claim 1, the bearing elements taking the form of needles.

4. A roller bearing characterized by the groove, sealing ring and spring of claim 1, the bearing elements taking the form of tapered rollers.

5. A bearing comprising two generally annular members, one within the other; bearing elements intervening between oppositely facing portions of the two annular members; means forming a continuous groove of triangular cross-section in the outer of the two opposing portions; a sealing ring in contact with the annular member in which is formed the other of the two opposing portions; and, anchored at its inner periphery to the sealing ring, a thin annular metal spring the transverse outer edge of which makes surface contact with one of the two side walls of said triangular groove, said spring being pre-loaded where it is anchored to the sealing ring.

6. A bearing as in claim 5 in which the anchored edge of the spring is clamped to the sealing ring.

7. A bearing as in claim 6 in which the anchored edge of the spring is clamped between the body portion of the sealing ring and a turned-over flange formed integrally with such body portion.

8. A bearing comprising two generally annular members, one within the other; bearing elements intervening between oppositly facing portions of the two annular members; means forming a continuous groove of triangular cross-section in the outer of the two opposing portions; a sealing ring in contact with the annular member in which is formed the other of the two opposing portions; and, anchored at its inner periphery to the sealing ring, a thin annular metal spring the transverse outer edge of which makes surface contact with one of the two side walls of said triangular groove, said spring having a concavo-convex portion adjoining its transverse outer edge which concavo-convex portion serves to angle such transverse outer edge out of parallelism with the axis of the spring.

9. A bearing as in claim 8 in which the concavo-convex portion is bowed inwardly toward the central plane of the bearing as a whole.

10. A bearing as in claim 9 in which the spring has a flat portion in the zone between the concavo-convex portion and the edge by which it is anchored to the sealing ring.

References Cited in the file of this patent

UNITED STATES PATENTS

| Number | Name | Date |
|---|---|---|
| 2,144,691 | Schmal | Jan. 24, 1939 |
| 2,237,616 | Smith | Apr. 8, 1941 |
| 2,298,463 | Burt | Oct. 13, 1942 |

FOREIGN PATENTS

| Number | Country | Date |
|---|---|---|
| 30,487 | Great Britain | A. D. 1909 |